Patented Feb. 11, 1941

2,231,353

UNITED STATES PATENT OFFICE

2,231,353

VULCANIZATION OF RUBBER

George W. Watt, Austin, Tex., assignor to Wingfoot Corporation, Wilmington, Del., a corporation of Delaware No Drawing. Application April 8, 1938,
Serial No. 200,950

12 Claims. (Cl. 260—784)

This invention relates to the vulcanization of rubber. More particularly, it relates to the vulcanization of rubber in the presence of a new class of accelerators which yield vulcanized rubber products having excellent physical properties. The invention includes the method of treating rubber, the rubber products produced and the accelerators per se.

Numerous materials are known which are useful as accelerators of the vulcanization of rubber, most of these falling into more or less well defined classifications. The materials which have been found by the present invention to be useful in the acceleration of the vulcanization of rubber belong to a class of compounds in which relatively little work has been done.

According to the practice of the invention, rubber is vulcanized in the presence of a material obtained by the interaction of a mercapto thio diazole with an arylene thiazole or an arylene selenazole. One method of preparing this type of accelerator is illustrated by the reaction of a 2-halo arylene thiazole or selenazole with a reactive salt of a 2-mercapto thio diazole. While the course of the reaction and the character of the products obtained have not been definitely established, it is believed that the final product is at least largely composed of a material having the structural formula

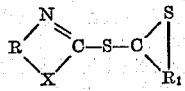

in which R is arylene,

is a thio diazole ring, and X is selected from the group consisting of sulfur and selenium. The following specific examples will serve to illustrate the practice of the invention.

Example 1

Sixteen parts of 2-chloro-6-nitro benzothiazole and 19.8 parts of the potassium salt of 2-mercapto-4-phenyl thio diazole 5-thione were refluxed together for 1½ hours in 250 parts of alcohol. The mixture was then cooled. The canary yellow solid which formed was filtered off and washed free from potassium chloride with water. The product was then washed with alcohol and ether, and dried. Twenty-two parts of product corresponding to 70% of the theoretical were obtained. The material obtained as outlined melted at 196°–198° C. The reaction is believed to be a simple meathesis which proceeds according to the following equation:

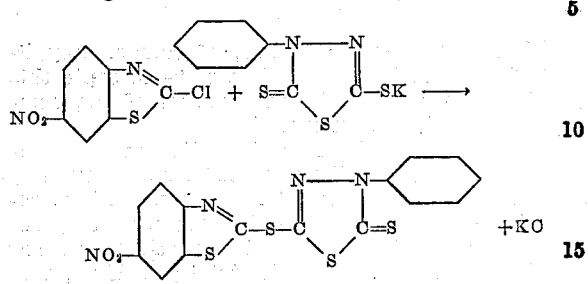

Example 2

Seventeen parts of 2-chloro benzothiazole and 26.4 parts of the potassium salt of 2-mercapto-4-phenyl thio diazole-5-thione were refluxed together for 16½ hours in 150 parts of alcohol. The crystals of potassium chloride which precipitated were filtered out of the hot solution. The filtrate was cooled, whereupon the white, crystalline product separated. These crystals were filtered off, washed with cold alcohol, and dried. The yield amounted to 33 parts or 93% of the theoretical. The probable course of the reaction is as follows:

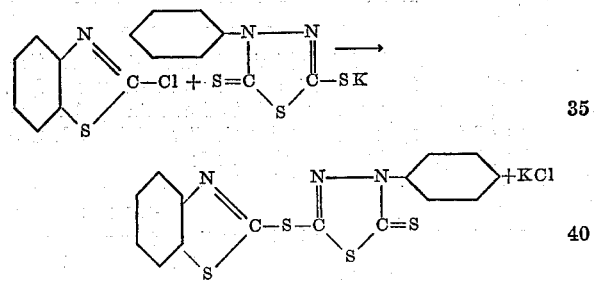

The foregoing examples are illustrative only and not limitative of the invention. Other halogens such as bromine and iodine may be substituted for the chlorine of the examples and other reactive salts such as the sodium, ammonium, etc. compounds may be substituted for the potassium salts of the examples.

Other 2-halo arylene thiazoles which may be employed in the practice of the invention are 2-chlor alpha and beta naphthothiazoles, the 2-chlor xylyl thiazoles, 2-chlor-5-nitro benzothiazole, 2-bromo-6-nitro benzothiazole, 2-chlor-5-chlor benzothiazole, 2-chlor-5-nitro-6-chlor benzothiazole, 2-bromo-4-phenyl benzothiazole, 2-chlor-4-methyl benzothiazole, 2-chlor-6-hydroxy benzothiazole, 2-chlor-4-methoxy benzothiazole, 2-chlor-6-ethoxy benzothiazole, 2-bromo-6-amino benzothiazole, 2-chlor-6-nitro-4-methyl benzothiazole, and other halogen-, nitro-, hydroxy-, alkoxy-, and amino-substituted 2-halo arylene thiazoles. As previously indicated in the broad statement of the invention the selenazoles corresponding to any of the foregoing may also be employed. Representative materials are 2-chlor benzoselenazole, 2-chlor-4-methyl benzoselenazole, the 2-chlor naphthoselenazoles, etc.

The following are various structural formulae further illustrating the mercapto thio diazoles which may be employed in the invention:

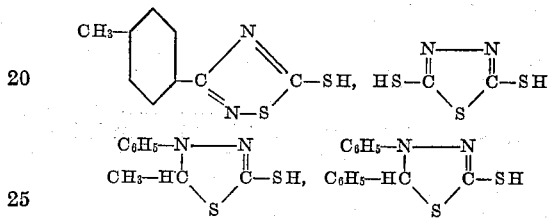

These compounds are also, of course, only illustrative of the broad class of 2-mercapto thio diazoles useful in the preparation of the compounds of the invention.

The compounds of the invention may be employed in most of the usual rubber compounding formulae. As a general rule, however, best results are obtained when they are used together with a basic nitrogen-containing activator such as diphenylguanidine, diortho tolyl guanidine, 2-4-diamino diphenyl amine, p-p'-diamino diphenyl methane, diphenyl guanidine neutral phthalate, butyl ammonium oleate, and the like. When so used, some of the species coming within the invention are, in particular, excellent delayed action accelerators.

The following formula is one in which the compounds of the invention have been found to yield very good results.

| | Parts by weight |
|---|---|
| Smoked sheet | 100 |
| Zinc oxide | 5 |
| Sulfur | 3 |
| Accelerator | 0.5 |
| Diphenylguanidine | 0.2 |

When the materials obtained according to the practice of Examples 1 and 2 were compounded into rubber according to this formula and samples of the mix were vulcanized and tested, the following results were obtained:

| Time in min. ° F. | Tensile | Elongation | Modulus kgs./cm.² | |
|---|---|---|---|---|
| | | | 500% | 700% |
| EXAMPLE 1 | | | | |
| 20/260 | No cure | | | |
| 30 | 75 | 890 | 11 | 28 |
| 40 | 133 | 840 | 18 | 60 |
| 60 | 151 | 740 | 31 | 117 |
| 80 | 156 | 720 | 37 | 141 |
| EXAMPLE 2 | | | | |
| 20/285 | 56 | 870 | 10 | 25 |
| 30 | 96 | 860 | 14 | 40 |
| 40 | 107 | 810 | 18 | 56 |
| 60 | 138 | 790 | 22 | 80 |
| 80 | 129 | 760 | 26 | 93 |

It will be apparent to those skilled in the art that various modifications may be made therein without departing from the spirit of the invention or from the scope of the appended claims.

What I claim is:

1. The process of treating rubber which comprises vulcanizing the same in the presence of a 2-arylene thiazyl-2-thio thiodiazole.

2. The process of treating rubber which comprises vulcanizing the same in the presence of 2-(6-nitrobenzothiazyl)-2-thio-4-phenyl thiodiazole-5-thione.

3. The process of treating rubber which comprises vulcanizing the same in the presence of 2-benzothiazyl-2-thio-4-phenyl thiodiazole-5-thione.

4. The process of treating rubber which comprises vulcanizing the same in the presence of a compound having the formula

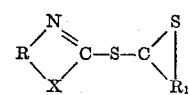

in which R is arylene,

is a thiodiazole ring, and X is selected from the group consisting of sulfur and selenium.

5. The process of treating rubber which comprises vulcanizing the same in the presence of a basic-nitrogen containing accelerator and a compound having the formula

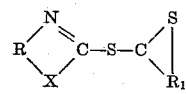

in which R is arylene,

is a thiodiazole ring, and X is selected from the group consisting of sulfur and selenium.

6. The process of treating rubber which comprises vulcanizing the same in the presence of a 2-arylene selenazyl 2-thio thiodiazole.

7. A rubber product which has been vulcanized in the presence of a 2-arylene thiazyl-2-thio-thiodiazole.

8. A rubber product which has been vulcanized in the presence of 2-(6-nitrobenzothiazyl)-2-thio-4-phenyl thiodiazole 5-thione.

9. A rubber product which has been vulcanized in the presence of 2-benzothiazyl-2-thio-4-phenyl thiodiazole-5-thione.

10. A rubber product which has been vulcanized in the presence of a compound having the formula

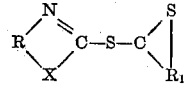

in which R is arylene,

is a thiodiazole ring, and X is selected from the group consisting of sulfur and selenium.

11. A rubber product which has been vulcanized in the presence of a basic nitrogen-containing accelerator and a compound having the formula

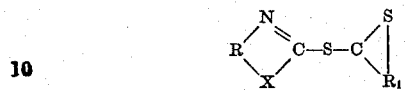

in which R is arylene,

is a thiodiazole ring, and X is selected from the group consisting of sulfur and selenium.

12. A rubber product which has been vulcanized in the presence of a 2-arylene selenazyl 2-thio thiodiazole.

GEORGE W. WATT.